Figure 1:
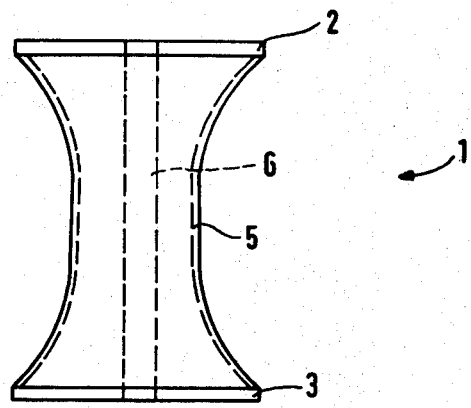

United States Patent [19]

Leonhardt et al.

[11] Patent Number: 4,468,970

[45] Date of Patent: Sep. 4, 1984

[54] COMPRESSION MEASURING DEVICE

[75] Inventors: Joachim Leonhardt; Bruno Wagener, both of Essen; Hans-Dieter Klein, Hattingen; Wilfried Siefer, Heiligenhaus, all of Fed. Rep. of Germany

[73] Assignee: Bergwerksverband GmbH, Fed. Rep. of Germany

[21] Appl. No.: 386,853

[22] Filed: Jun. 9, 1982

[30] Foreign Application Priority Data

Jun. 10, 1981 [DE] Fed. Rep. of Germany ....... 3122866

[51] Int. Cl.³ ............................................. G01B 11/20
[52] U.S. Cl. .................................................... 73/762
[58] Field of Search .......................... 73/762, 821, 783; 116/212

[56] References Cited

U.S. PATENT DOCUMENTS 2,724,964 11/1955 Singdale ............................... 73/762
2,824,481 2/1958 Johnson ............................. 73/762 X Primary Examiner—Jerry W. Myracle
Attorney, Agent, or Firm—Townsend and Townsend

[57] ABSTRACT

An apparatus for the approximate determination of forces acting on a support frame which has a compression member disposed between two pressure plates. The compression member has a coating of a material such as enamel which separates from the member as a function of the members' deformation under compressive forces and thus is an indicator of the magnitude of such forces.

16 Claims, 1 Drawing Figure

COMPRESSION MEASURING DEVICE

The invention relates to measuring devices for the approximation of supporting forces required by the timbering or support frames of underground mines or tunnels as well as scaffolds. Broadly speaking, it comprises a pressure test element disposed between two pressure plates, the rupture deformation of which is a measurement of the required supporting forces.

In the underground mining and tunnel construction, the forces acting on the timbering are determined in accordance with a known measuring device by pressure cells mounted between the timbering and rock or between frictionally connected parts of the lining. These are steel containers having a cell filled with fluid, the displacement or pressure rise of which is measured and used as a direct measurement for the required strength of the lining.

A disadvantage of such cells is that they are inaccurate for determining eccentric or oblique loads. Besides, such pressure cells are easily damaged.

German Pat. No. 2,618,538 discloses another known measuring device which is mounted between two pressure plates, the deformation of which is measured. In order to precisely measure forces which do not act centrally, this device has several parts arranged vertically between the pressure plates. The parts are made of different materials and have compressive strengths which increase from the outside towards the center. Through the use of individual parts, tensile stresses due to edge pressure is to be prevented. Further, the sensitivity and thereby the accuracy of the measurement is to be increased.

The disadvantage of this device is that it is relatively expensive and that its observation and the determination of the forces is difficult since it requires the identification of the remaining parts of the device. In addition, it is possible that the various parts of the device are affected by underground climatic conditions which may impair the accuracy of the measurements.

The present invention provides a measuring device which is not affected by the environment and provides excellent readings of the loads at readily visible locations on the device.

The problem is solved in accordance with the invention by equipping the device with a surface layer having low bearing strength, preferably enamel.

In the measuring device of the present invention, the deformation under load and the rupture of a brittle component serve as measurements for the forces involved. Because of the low bearing properties of the surface layer, forces acting on the timbering are readily visible even under the unfavorable lighting conditions which exist underground. The surface layer, in particular the enamel coating, affords at the same time a protection against the environment so that it cannot influence the measurement. This applies in particular to sites having a high dust content, high humidity and where dust binders are in use.

According to the invention, the measuring device preferably has a cast iron body because of its advantageous proprty of neither shattering during rupture nor being subject to splintering when subjected to relatively large compressive forces. When the cast iron body is enameled, it constitutes an advantageous pressure test device of optimal efficiency. For this purpose, the enameled cast iron body preferably has a strength in the range of $Rm=100$ to $Rm=250$ $N/mm^2$.

An optimal shape for the measuring device preferably indicates throughout the course of rupture the direction in which the force is acting. This is accomplished by integrally constructing the pressure plates and the cast iron body. This can be implemented best by giving the central member or body of the device and the pressure plates a Diabalo-shape. Mounting elements and indicator marks are provided in accordance with the invention by equipping the measuring device with a central hole or with cast-in lugs. These facilitate the mounting of the test device in the desired direction, particularly if, according to the invention, the device is constructed of multiple parts.

The invention distinguishes itself particularly by the fact that the surface coating, preferably enamel, makes it possible to obtain prior to the resulting rupture an indication of load at predetermined fractions of the maximum load because of the deformation of the test piece and the gradual flaking off of the enamel. By selecting a cast iron body with an enamel surface coating, a measuring device is obtained which does not normally shatter upon rupture and which does not normally splinter even at higher strength. Thus, the measuring device of the present invention can be readily and comfortably handled and clearly indicates the encountered loads. Its effectiveness is not impaired by unfavorably acting loads or by environmental influences.

One embodiment of the invention is shown in detail in the drawing. FIG. 1 shows a Diabalo-shaped pressure measuring device 1 mounted between integrated pressure plates 2, 3. The device has a surface layer 5 which, as shown in the drawing, covers only the central member of the body of the device, but which can also be extended to cover pressure plates 2, 3. In the center of the device there is a central hole 6 which alone, or together with cast-in lugs (not shown) serves as a mounting and marking aid for properly orienting the device upon installation.

The measuring device 1 of cast iron is protected by the enamel coating against environmental influences. As a practical matter, the coating should not be considered a bearing layer, but rather as an indicator of the load bearing capacity which results from its flaking off the underlying surface.

We claim:

1. Apparatus for the approximate determination of a force acting on a supporting frame comprising first and second pressure plates, a compression member constructed of cast iron disposed between the plates, the deformation of which under a compressive force is an indicator of the magnitude of such force, and a layer of a material applied to the surface of the member and adapted to separate from the surface in response to a deformation of the member.

2. Apparatus according to claim 1, wherein the layer comprises enamel.

3. Apparatus according to claim 1 wherein the member comprises cast iron having a strength of between about 100 to about 250 $N/mm^2$, and the layer comprises enamel.

4. Apparatus according to claim 1 wherein the pressure plates are integrally constructed with the member.

5. Apparatus according to claim 4 wherein the pressure plates and the member have a Diabolo shape.

6. Apparatus according to claim 1 wherein the member includes a concentric hole.

7. Apparatus according to claim 1 wherein the member and the plates are constructed of a plurality of separate parts.

8. Apparatus according to claim 1, wherein the layer comprises enamel.

9. Apparatus according to claim 1 wherein the member includes a concentric hole.

10. Apparatus for the approximate determination of a compressive force acting between first and second pressure plates comprising a compression member disposed between the plates, the deformation of which under a compressive force is an indicator of the magnitude of such force, the member being defined by a peripheral surface which is generally circular in a direction perpendicular to an axis of the member and generally concave in a direction parallel to the axis, and a layer of a material applied to the surface of the member and adapted to separate from the surface in response to a deformation of the member.

11. Apparatus according to claim 10 wherein the member comprises cast iron.

12. Apparatus for the approximate determination of a compressive force acting between first and second pressure plates comprising a longitudinally arcuate shaped compression member adapted to be disposed between the plates, the deformation of which under a compressive force is an indicator of the magnitude of such force, the member including a concentric hole, and a layer of a material applied to the surface of the member and adapted to separate from the surface in response to a deformation of the member.

13. Apparatus according to claim 12 wherein the member comprises cast iron.

14. Apparatus according to claims 12 or 13, wherein the layer comprises enamel.

15. Apparatus for the approximate determination of a compressive force acting between first and second pressure plates comprising an elongated compression member adapted to be placed between the plates to measure the force having first and second, relatively large diameter ends, an exterior surface terminating at the first and second ends and having a generally concave configuration in the direction from the first end to the second end, and a longitudinal hole which is concentric with the exterior surface, and a layer of a material applied to the surface and adapted to separate from the surface in response to a deformation of the member, whereby a compressive force applied to the member causes the deformation thereof and results in a separation of the material from the surface of the member which is indicative of the magnitude of the force applied to the member.

16. Apparatus for the approximate determination of a compressive force acting between first and second pressure plates, the apparatus comprising a compression member adapted to be placed between the plates to measure the force and having an exterior surface which is concentric about an axis of the member, is circumferentially continuous, and longitudinally concave, and a layer of a material applied to the surface of the member and adapted to flake off the surface as a function of the deformation of the device under the force, whereby the magnitude of the force can be approximately determined irrespective of the angularity of the force relative to the axis of the member and irrespective of the point relative to the exterior surface of the member from which it is viewed.

* * * * *

UNITED STATES PATENT AND TRADEMARK OFFICE
CERTIFICATE OF CORRECTION

PATENT NO. : 4,468,970

DATED :

INVENTOR(S) : Joachim Leonhardt, Bruno Wagener, Hans-Dieter Klein, Wilfried Siefer, Dieter Orbach.

It is certified that error appears in the above-identified patent and that said Letters Patent is hereby corrected as shown below:

On the title page,

Please add to the list of inventors, the following name --Dieter Orbach of Lindlar, Fed. Rep. of Germany--.

Signed and Sealed this

Twenty-sixth Day of March 1985

[SEAL]

*Attest:*

DONALD J. QUIGG

*Attesting Officer*    *Acting Commissioner of Patents and Trademarks*